United States Patent [19]

Jung

[11] Patent Number: 5,748,244
[45] Date of Patent: May 5, 1998

[54] ADAPTIVE RUNLENGTH CODING BASED ON ZERO AND NON-ZERO SUBBLOCKS

[75] Inventor: Hae-Mook Jung, Seoul, Rep. of Korea

[73] Assignee: Daewoo Electronics Co., Ltd., Seoul, Rep. of Korea

[21] Appl. No.: 622,225

[22] Filed: Mar. 27, 1996

[30] Foreign Application Priority Data

Mar. 28, 1995 [KR] Rep. of Korea ............ 95-6617

[51] Int. Cl.⁶ ................................................. H04N 7/30
[52] U.S. Cl. ..................................... 348/403; 348/420
[58] Field of Search ............................ 348/420, 403, 348/404, 405, 409, 415, 416, 400, 401, 402, 384, 390; 382/245, 246, 232; 341/63, 67, 50; 358/261.1, 261.2, 261.3, 427, 426; H04N 7/133

[56] References Cited

U.S. PATENT DOCUMENTS 4,821,119  4/1989  Gharavi .................................. 348/402
5,253,055  10/1993 Civanlar ................................. 348/420
5,461,422  10/1995 Hsieh ..................................... 348/405
5,500,678  3/1996  Puri ....................................... 348/405

*Primary Examiner*—Bryan S. Tung
*Attorney, Agent, or Firm*—Anderson, Kill & Olick, P.C.

[57] ABSTRACT

A method, for use in a video signal encoding system, for processing a block of quantized transform coefficients first divides the block of quantized transform coefficients into a predetermined number of subblocks and detects one or more non-zero subblocks, each of the non-zero subblocks having at least one non-zero valued quantized transform coefficients therein. Thereafter, a predetermined sequence of the quantized coefficients is provided based on the detected non-zero valued subblocks, the provided sequence of the quantized transform coefficients consisting of all the coefficients within the non-zero subblocks. The predetermined sequence of the coefficients is then runlength and variable length coded for the transmission thereof.

4 Claims, 4 Drawing Sheets

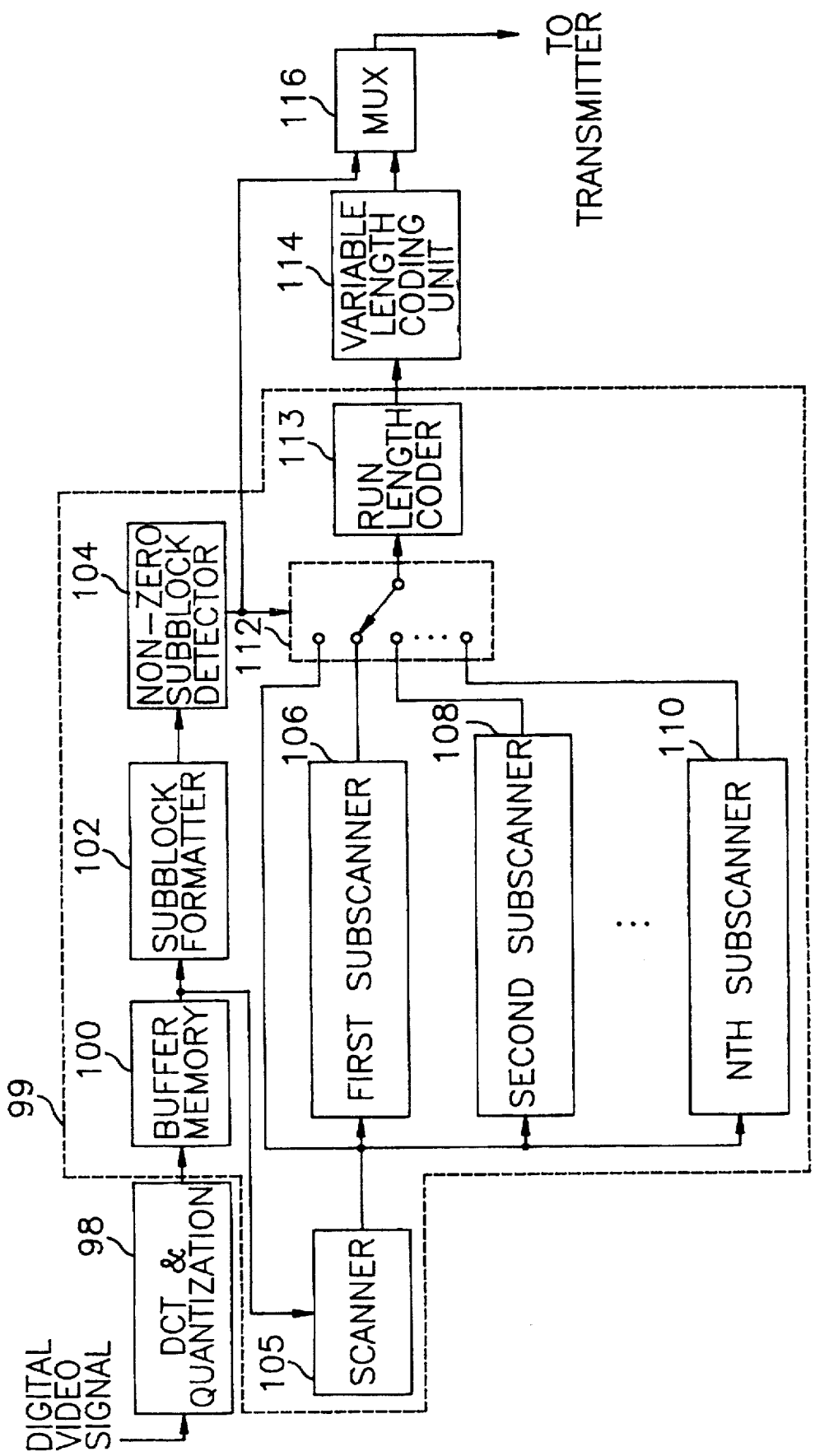

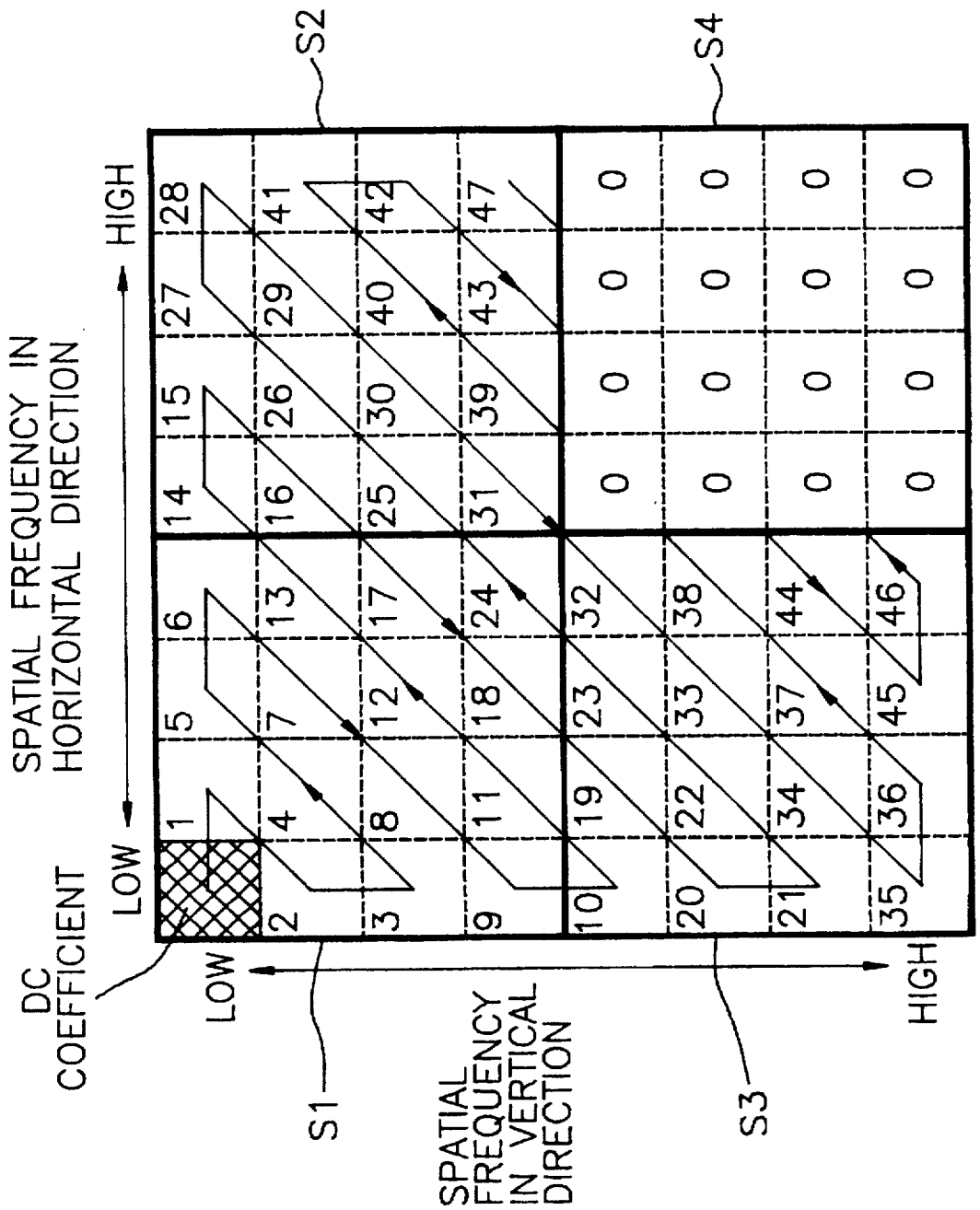

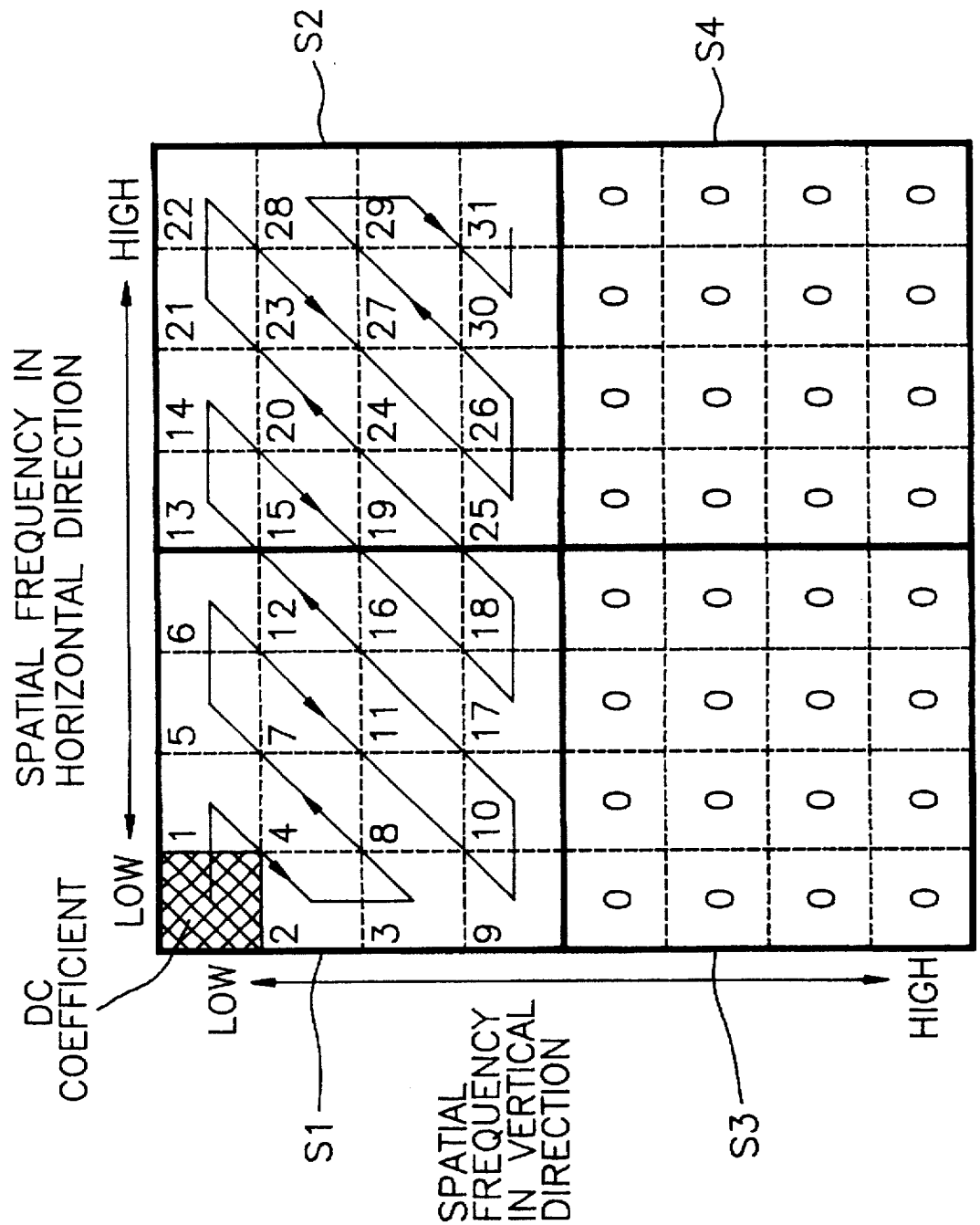

ADAPTIVE RUNLENGTH CODING BASED ON ZERO AND NON-ZERO SUBBLOCKS

FIELD OF THE INVENTION

The present invention relates to a method for encoding a digital video signal; and, more particularly, to an improved runlength coding method for use in a video signal encoding system.

DESCRIPTION OF THE PRIOR ART

As is well known, transmission of digitized video signals can attain video images of a much higher quality than the transmission of analog signals. When an image signal is expressed in a digital form, a substantial amount of data is generated for transmission, especially in the case of a high definition television(HDTV) system. Since, however, the available frequency bandwidth of a conventional transmission channel is limited, in order to transmit the substantial amounts of digital data therethrough, it is inevitable to compress or reduce the volume of the transmission data.

In a modern video image transmission or processing system, a digital video signal is coded by processing a block of pixels by using, e.g., a discrete cosine transform(DCT). The DCT, which reduces or removes spatial redundancies within a frame of image data, converts a block of digital image data, for example, a block of 8×8 pixels, into a block of transform coefficient data. The block of transform coefficient data is quantized and then zigzag scanned, thereby generating a stream of encoded image data composed of a plurality of zero and non-zero values. Thereafter, the data stream is subjected to a runlength coding to exploit runs of zeros therein.

A conventional apparatus employing the runlength coding converts the data stream into a multiplicity of run-level pairs, each of the run-level pairs including a runlength and a corresponding level, wherein the runlength represents the number of zeros in a run of continuous zeros preceding a non-zero value and the level indicates the magnitude of the non-zero value following the run of continuous zeros.

Generally, the stream of run-level pairs is further processed by a variable length coding(VLC) technique. This technique is used to convert fixed-length data of the run-level pairs into variable-length codewords based on the statistical occurrences of the data. As is well known the length of the codewords is chosen in such a manner that shorter codewords are used to represent more frequently occurring run-level pairs and longer codewords are chosen to represent less frequently occurring run-level pairs. By properly assigning the variable-length codewords to a library of all possible source codewords, i.e., run-level pairs, the average word length of the variable-length codewords becomes shorter than that of the original run-level pairs, thereby rendering it possible to achieve an effective data compression. Since, however, in a conventional VLC technique, a shorter runlength would entails a shorter variable length codeword in case run-level pairs have an identical level, it would be advantageous to find a coding method which can reduce the runlength of the run-level pairs.

SUMMARY OF THE INVENTION

It is, therefore, a primary object of the invention to provide a runlength coding method for use in a video signal encoding system, which is capable of reducing the runlength of the run-level pairs.

In accordance with the present invention, there is provided a method, for use in a video signal encoding system, for encoding a block of a digital video signal, which comprises the steps of:

transforming the block of the digital video signal into a block of transform coefficients;

converting the block of transform coefficients into a block of quantized coefficients;

dividing the block of quantized coefficients into a predetermined number of subblocks;

detecting one or more non-zero subblocks, each of which having at least one non-zero valued quantized coefficient;

providing a predetermined sequence of quantized coefficients based on the detected non-zero subblocks, the predetermined sequence of the quantized coefficients consisting of quantized coefficients included in the detected non-zero subblocks;

runlength coding the predetermined sequence of the quantized coefficients to thereby provide a set of runlength coded data; and variable length coding the runlength coded data.

BRIEF DESCRIPTION OF THE DRAWINGS

The above and other objects and features of the present invention will become apparent from the following description of preferred embodiments given in conjunction with the accompanying drawings, in which:

FIG. 1 represents a digital video signal encoding system having a runlength coding unit in accordance with the present invention; and FIGS. 2A to 2C exemplify non-zero subblock arrangements within the block.

DETAILED DESCRIPTION OF THE PREFERRED EMBODIMENTS

Figure 2A:
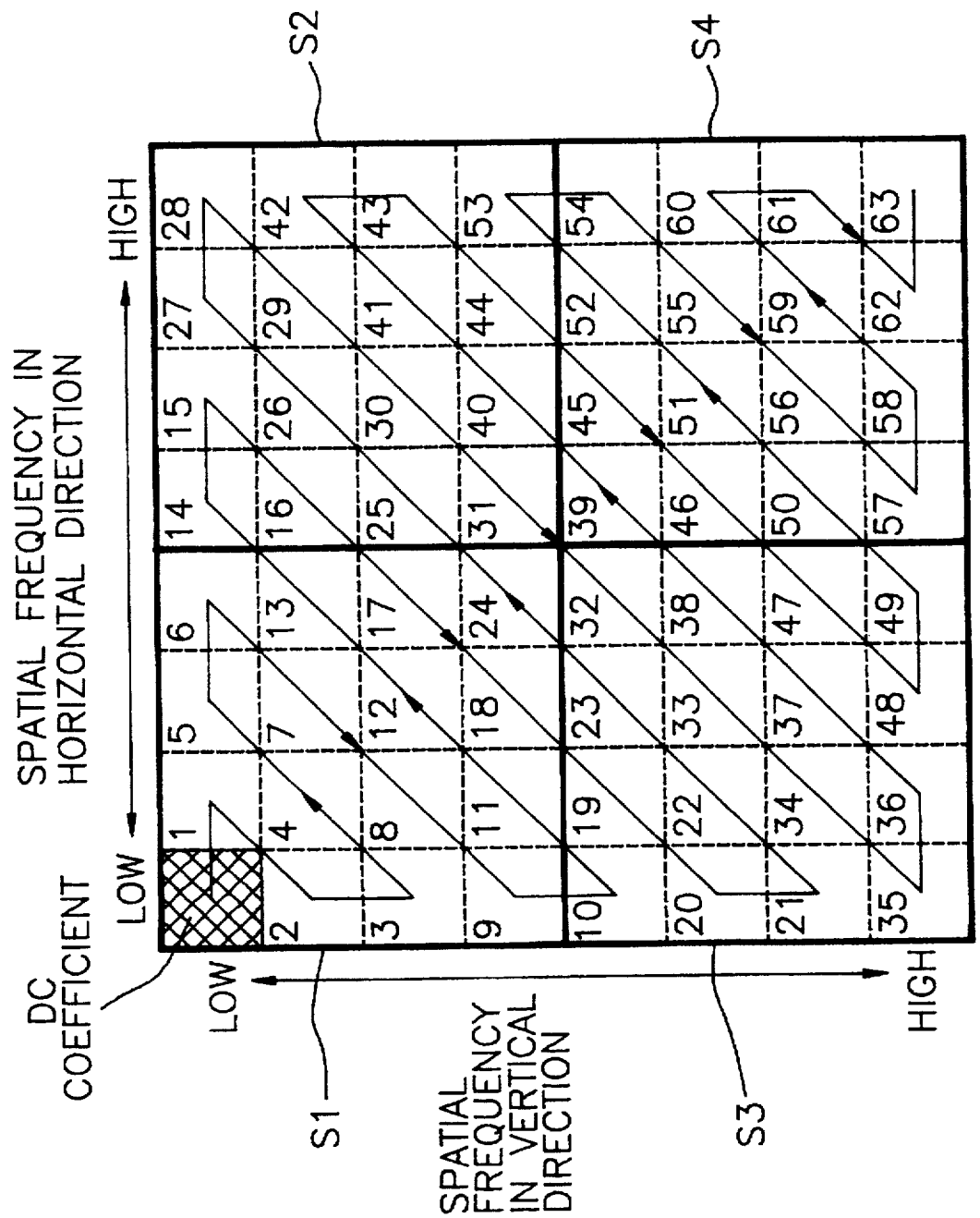

Referring to FIG. 1, there is shown a video signal encoding system having a runlength coding unit in accordance with a preferred embodiment of the present invention. The video signal encoding system includes a DCT & quantization block 98, a runlength coding unit 99, a variable length coding unit 114 and a multiplexer 116.

A digital video signal is inputted to the DCT & quantization block 98, wherein the input signal is processed on a block-by-block basis. The block size of the input signal typically ranges between 8×8 and 32×32 pixels. Actually, the digital video signal may be an inter-mode or an intra-mode video signal. As well known in the art, the inter-mode video signal represents a motion compensated DPCM (differential pulse code modulation) signal, while intra-mode video signal represents an original pixel data for a current frame of the video signal. As is well known in the art, at the DCT & quantization block 98, each block of the input signal in the spatial domain is transformed into a block of transform coefficients in the frequency domain by employing, e.g., DCT; and then the block of transform coefficients is quantized by using a known quantization method. The block of quantized transform coefficients is fed to the runlength coding unit 99 for further processing.

The runlength coding unit 99 includes a buffer memory 100, a subblock formatter 102, a non-zero subblock detector 104, a scanner 105, a plurality of subscanners 106, 108 and 110, a switch 112 and a runlength coder 113. The block of quantized transform coefficients from the DCT & quantization block 98 is fed to the buffer memory 100 to be temporarily stored therein. At the subblock formatter 102, the block of quantized transform coefficients retrieved from the buffer memory 100 is divided into a predetermined number of subblocks. For example, when the size of the block of quantized transform coefficients is 8×8, the block is divided into, e.g., four subblocks(S1, S2, S3 and S4) as shown in FIG. 2A. The subblocks of quantized transform coefficients from the subblock formatter 102 are sent to the non-zero subblock detector 104.

The non-zero subblock detector 104 detects one or more non-zero subblocks and positions thereof within the block to thereby determine a subblock arrangement thereof, each of the non-zero subblocks having at least one non-zero valued quantized transform coefficient therein. The determined arrangement belongs to a set of predetermined subblock arrangements, the set of predetermined subblock arrangements including all possible arrangements of the non-zero subblocks. There are shown in FIGS. 2A to 2C exemplary subblock arrangements, consisting of four non-zero subblocks S1 to S4, three non-zero subblocks S1, S2 and S3, and two non-zero subblocks S1 and S2, respectively. Thereafter, the non-zero subblock detector 104 provides the switch 112 and the multiplexer 116 with a flag signal indicating the subblock arrangement selected therein. The flag signal is employed as a switching control signal at the switch 112.

In the meantime, the block of quantized transform coefficients stored in the buffer memory 100 is provided to the scanner 105. At the scanner 105, the quantized transform coefficients in the block are scanned along a zigzag scanning path as shown in FIG. 2A, wherein the scanning sequence is numerated at the corresponding positions of the transform coefficients in the block. It should be noted that, as well known in the art, if the input digital video signal is of an inter-mode, the quantized transform coefficients are scanned starting from a DC coefficient located at the left-top corner of the block. In case the input digital video signal is of an intra-mode, the DC coefficient is coded separately at an intra-DC coefficient coder(not shown) by using, e.g., DPCM technique and the scanning sequence starts from a first AC coefficient located at a position represented by "1" in FIG. 2A.

A set of the scanned transform coefficients from the scanner 105 are provided to the switch 112 and the subscanners 106 to 110.

Each of the subscanners 106 to 110 corresponds to one of the subblock arrangements described with respect to the non-zero subblock detector 104 and selects, out of the set of scanned transform coefficients from the scanner 105, a set of transform coefficients in accordance with a subblock arrangement it belongs to. For instance, if the subscanner 106 corresponds to the subblock arrangement as shown in FIG. 2B, all of the zero-valued transformed coefficients corresponding to the subblock S4 are removed from the scanned transform coefficients from the scanner 105, resulting in a set of transform coefficient having a scanning order as depicted in FIG. 2B. Similarly, if a selector is of an subblock arrangement having non-zero subblocks S1 and S2, the output therefrom is represented by a scanning sequence illustrated in FIG. 2C. Each set of transform coefficients from the subscanners 106 to 110 is provided to the switch 112.

The switch 112, in response to the flag signal from the non-zero subblock detector 104, selects one of the sets of transform coefficients from the scanner 105 and the subscanners 106 to 110. The selected set of the transform coefficients is sent to a runlength coder 113.

At the runlength coder 113, the selected set of the transform coefficients is runlength coded to provide run-level pairs. The runlength coded signal is provided to the variable length coding unit 114, wherein the runlength coded signal is variable-length coded by defining a respective relationship between each of the run-level pairs and its corresponding variable length codeword. The variable-length coded signal is sent to the multiplexer 116, wherein the variable-length coded signal from the variable-length coding unit 114 and the flag signal from the zero subblock detector 104 are multiplexed. Thereafter, the multiplexed signal is provided to a transmitter(not shown) for the transmission thereof.

While the present invention has been shown and described in connection with the preferred embodiments only, it will be readily apparent to those of ordinary skill in the art that many changes and modifications may be made without departing from the spirit and scope of the invention as defined in the appended claims.

What is claimed is:

1. A method, for use in a video signal encoding system, for encoding a block of a digital video signal, comprising the steps of:

transforming the block of the digital video signal into a block transform coefficients;

converting the block of transform coefficients into a block quantized coefficients;

dividing the block of quantized coefficients into a predetermined number of subblocks;

classifying each subblock of quantized coefficients as either a zero subblock having only zero valued quantized coefficients or a non-zero subblock having at least one non-zero quantized coefficient; and providing a predetermined sequence of quantized coefficients based on the relationship between the zero subblocks and the non-zero subblocks, the predetermined sequence of the quantized coefficients consisting of quantized coefficients included in the non-zero subblocks;

runlength coding the predetermined sequence of the quantized coefficients to thereby provide a set of runlength coded data; and variable length coding the runlength coded data.

2. The method in accordance with claim 1, further comprising the step of providing information representing the relationship between the zero subblocks and the non-zero subblocks.

3. Apparatus for encoding a block of a digital video signal in a video signal encoding system, comprising:

a transformer for transforming the block of the digital video signal into a block transform coefficients;

a converter for converting the block of transform coefficients into a block quantized coefficients;

a divider for dividing the block of quantized coefficients into a predetermined number of subblocks;

a device for classifying each subblock in the block quantized coefficient as either a zero subblock having a zero valued quantized coefficients or a non-zero subblock having at least one non-zero quantized coefficient; and a device for providing a predetermined sequence of quantized coefficients based on the relationship between the zero subblocks and the non-zero subblocks, the predetermined sequence of the quantized coefficients consisting of quantized coefficients included in the non-zero subblocks;

a runlength coder for runlength coding the predetermined sequence of the quantized coefficients to thereby provide a set of runlength coded data; and a variable length to coder for variable length coding the runlength coded data.

4. The apparatus in accordance with claim 3, further comprising a device for providing information representing the relationship between the zero subblocks and the non-zero subblocks.

* * * * *